United States Patent [19]

Maurer

[11] Patent Number: 5,052,843
[45] Date of Patent: Oct. 1, 1991

[54] COUPLING

[75] Inventor: Ruprecht Maurer, Bad Homburg, Fed. Rep. of Germany

[73] Assignee: Ringspann GmbH, Homburg, Fed. Rep. of Germany

[21] Appl. No.: 505,440

[22] Filed: Apr. 6, 1990

[30] Foreign Application Priority Data

Apr. 8, 1989 [DE] Fed. Rep. of Germany ....... 3911513
Feb. 26, 1990 [DE] Fed. Rep. of Germany ....... 4005965

[51] Int. Cl.$^5$ ................................................ F16D 1/00
[52] U.S. Cl. ........................................ 403/15; 403/31; 403/371
[58] Field of Search ................... 403/15, 31, 368, 371

[56] References Cited

U.S. PATENT DOCUMENTS 2,293,085 8/1942 Stieber ................................. 403/15
4,650,364 3/1987 Kark ................................. 403/31 X

FOREIGN PATENT DOCUMENTS 3744284 7/1989 Fed. Rep. of Germany ........ 403/15

Primary Examiner—Andrew V. Kundrat
Attorney, Agent, or Firm—Edwin E. Greigg; Ronald E. Greigg

[57] ABSTRACT

The invention relates to an apparatus for coupling a shaft or a hub by means of a radially resilient bush, which can be radially clamped to the shaft or hub by axially tightenable clamping elements by exposing the clamping elements to a radially operative spring assembly; the release of the coupling is effected by means of a hydraulically- or pneumatically-actuated cylinder and piston arrangement. The nucleus of the invention is that the spring assembly is accommodated in the cylinder chamber acted upon by the pressure fluid.

20 Claims, 6 Drawing Sheets

COUPLING

BACKGROUND OF THE INVENTION

The invention relates to an apparatus for coupling a rotationally cylindrical part, in particular a shaft or a hub, in which a radially resilient bush is capable of being clamped to the cylindrical part by being radially acted upon by clamping elements; to this end, the clamping elements are exposed in turn to an axially operative spring assembly, in order to couple the cylindrical part to the bush or to a connection part joined to it. The release of the coupling is effected by means of a cylinder and piston arrangement that is actuated by a hydraulic pressure medium and acts upon the spring assembly counter to its force acting upon the clamping elements.

Various embodiments of such couplings are known. In German Patent 28 45 266, the object is fast blocking of a rod that passes axially through the coupling, while in the present case the coupling is intended primarily to bring about a releasable connection that is fixed against relative rotation. This connection fixed against relative rotation can be effected by means of conical tightening disks, which are combined into sets and are supported axially in the region of one face end, while on the other face end they are braced to the shaft or hub by axially acting spring elements. To release the coupling, the spring pressure must be suspended; this is effected hydraulically by means of a cylinder and piston arrangement. The terms "cylinder" and "piston" as used here should be understood here in the broadest sense. In other words, in the ensuing discussion they include any structural elements that form a chamber of variable volume for the pressure fluid and that are displaced relative to one another when pressure is imposed.

OBJECT AND SUMMARY OF THE INVENTION

It is the object of the present invention to simplify the structural design of the couplings described above and to reduce their structural volume.

According to the invention, this object is attained in that the spring assembly, which is necessary for actuating the conical tightening disks, is disposed in the cylinder chamber acted upon by the hydraulic or pneumatic pressure medium.

This has the advantage of combining two previously separate component assemblies with one another. The materials and space necessary for the separate actuating pistons required to release the coupling are dispensed with. Accordingly, the coupling according to the invention is distinguished by a simple, compact design.

It also becomes possible for the cylinder or piston, but suitably both of these parts of the cylinder and piston arrangement, to be embodied by components of the coupling housing. This reduces the production cost still further.

If the coupling is to be used for coupling a shaft, it is recommended that the aforementioned radially resilient bush be connected to a housing end flange, which with an outer cylinder housing of approximately L-shaped profile displaceable relative to it forms the cylinder chamber in which the spring assembly is accommodated. The spring assembly can act upon the clamping elements via the displaceable outer cylinder, which simultaneously functions as an outer housing, and thus clamps the bush to the shaft.

Contrarily, for coupling a hublike part, the cylinder of the cylinder and piston assembly suitably extends into the hublike part, and carries the clamping elements on its outside, while the spring assembly is disposed in its interior and in turn is guided on a tang, functioning as a piston, of a housing end flange. In that case, the cylinder itself forms the intermediate part between the spring assembly and the tightening disks.

For embodying the clamping elements, two alternative structural forms are particularly suitable: either a plurality of conical tightening disks disposed axially beside one another is used, which spread axially apart when force is introduced and thereby exert the desired radial force upon the bush, or clamping elements comprising parts that are movable axially relative to one another and in so doing slide over one another along their conical circumferential faces are used; the amount of taper is selected such that when the two parts are pushed together, the desired radial force is exerted upon the bush.

Performing the clamping with tightening disks has the advantage that converting the induced axial force into radial force takes place virtually without friction and with an increasing transmission ratio. Contrarily, the conical clamping has the advantage that fewer individual parts are needed, and that larger tolerances in diameter can be accepted.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
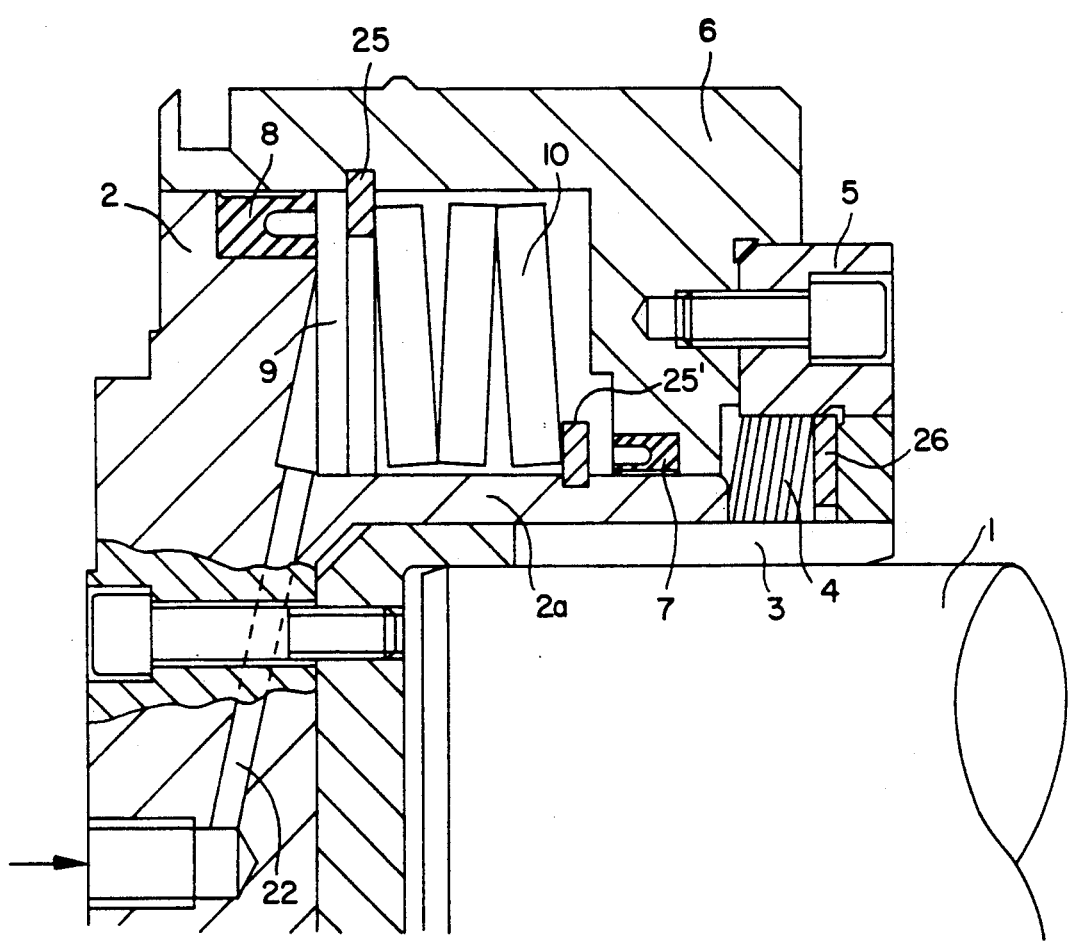
FIG. 1 is an axial section through a shaft coupling having tightening disks.

FIG. 1 shows a shaft 1, which is to be connected in a manner fixed against relative rotation to a drive mechanism not further shown, or released again as needed from it, via the coupling according to the invention and its connection part 2. The structure of the coupling is as follows:

The aforementioned connection part 2 forms an essentially radially extending housing end flange, and in its center it has a bush 3 joined to it in a manner fixed against relative rotation. The bush 3 fits around the end of the shaft 1 and is slit axially in this vicinity, to increase its elasticity. Numerous conical, radially slit tightening disks 4 of the kind known by the registered trademark "Ringspann", are disposed about the outer circumference of the bush 3. They are supported axially on one end on a protruding collar 2a of the housing end flange 2, and on the other end on a ring 5 that is screwed to an outer cylinder 6. The tightening disks 4 are held in place by an abutment means 26 disposed against a stop face of outer cylinder 6. The outer cylinder 6 has an L-shaped contour and is axially displaceably guided by its inwardly extending wall part on the collar 2a and otherwise on the outer circumference of the end flange 2. Sealing rings 7 and 8 are disposed on each of the two points of contact. A cylinder chamber 9 is defined between the outer cylinder 6 and the housing end flange 2, and the sealing rings serve to seal adjoining surfaces therebetween. The cylinder chamber can be acted upon by pressure fluid, in particular hydraulic oil, through a line 22.

Three disk springs 10 placed counter to one another are accommodated in the interior of the cylinder chamber 9, and are each axially braced via stop rings 25, 25' between the protruding collar 2a of the end flange 2 on one end and the outer cylinder 6 on the other.

As a result, the outer cylinder 6 is displaced to the left relative to the end flange 2, and the conical tightening disks 4 are correspondingly pressed into a steeper edge inclination, or in other words set upright. This reduces the interior diameter of the tightening disks 4, and they correspondingly press the radially resilient bush 3 against the shaft 1. The pressure is dimensioned such that the desired torque is reliably transmitted by the end flange 2 onto the shaft 1 or vice versa. If the coupling is to be released, then pressure fluid is forced into the cylinder chamber 9 via the line 22. This displaces the outer cylinder 6 to the right and suspends the clamping action of the tightening disks 4.

It is clear from the drawing that by accommodating the disk springs 10 in the cylinder chamber 9 acted upon by the pressure fluid, a very space-saving design with few parts is attained.

Figure 2:
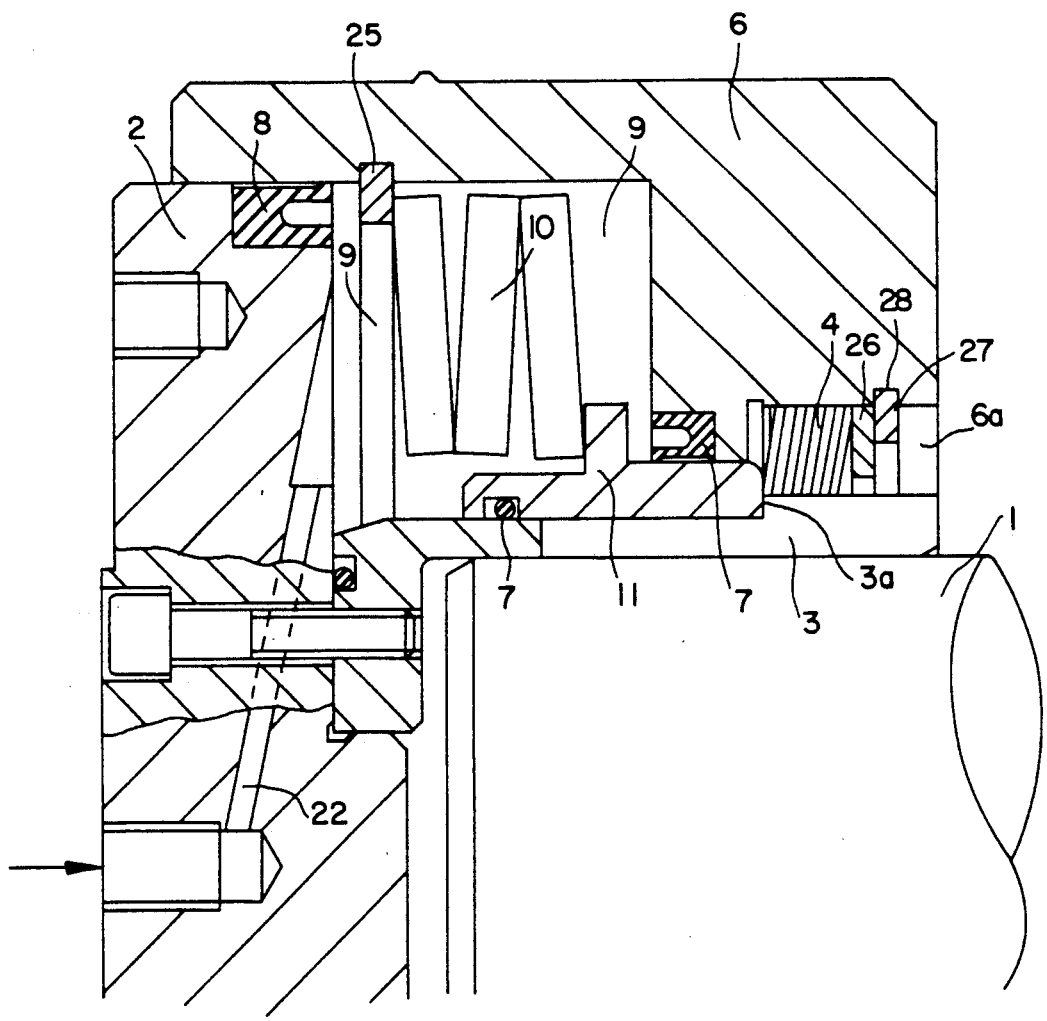
FIG. 2 is an axial section through a similar coupling.

FIG. 2 shows a similar version. Here, the protruding collar 2a is simply left out, and instead an axially displaceable intermediate part 11 is disposed on the bush 3. This intermediate part 11 is supported on its right-hand end on a stop 3a of the bush 3 and thus likewise forms a stationary stop for the disk springs 10. On their opposite end, the disk springs again act upon the outer cylinder 6, via stop ring 25 resulting in the same function as in the previous exemplary embodiment. Sealing of the cylinder chamber 9 with respect to the tightening disks 4 is again effected by a seal 7, which here is disposed between the outer cylinder 6 and the intermediate part 11. In this embodiment the tightening disks are inserted through a bore 6a and held in place against abutment means 26 via a gearing ring 27 seated in a groove 28 provided internally of said bore 6a.

Figure 3:
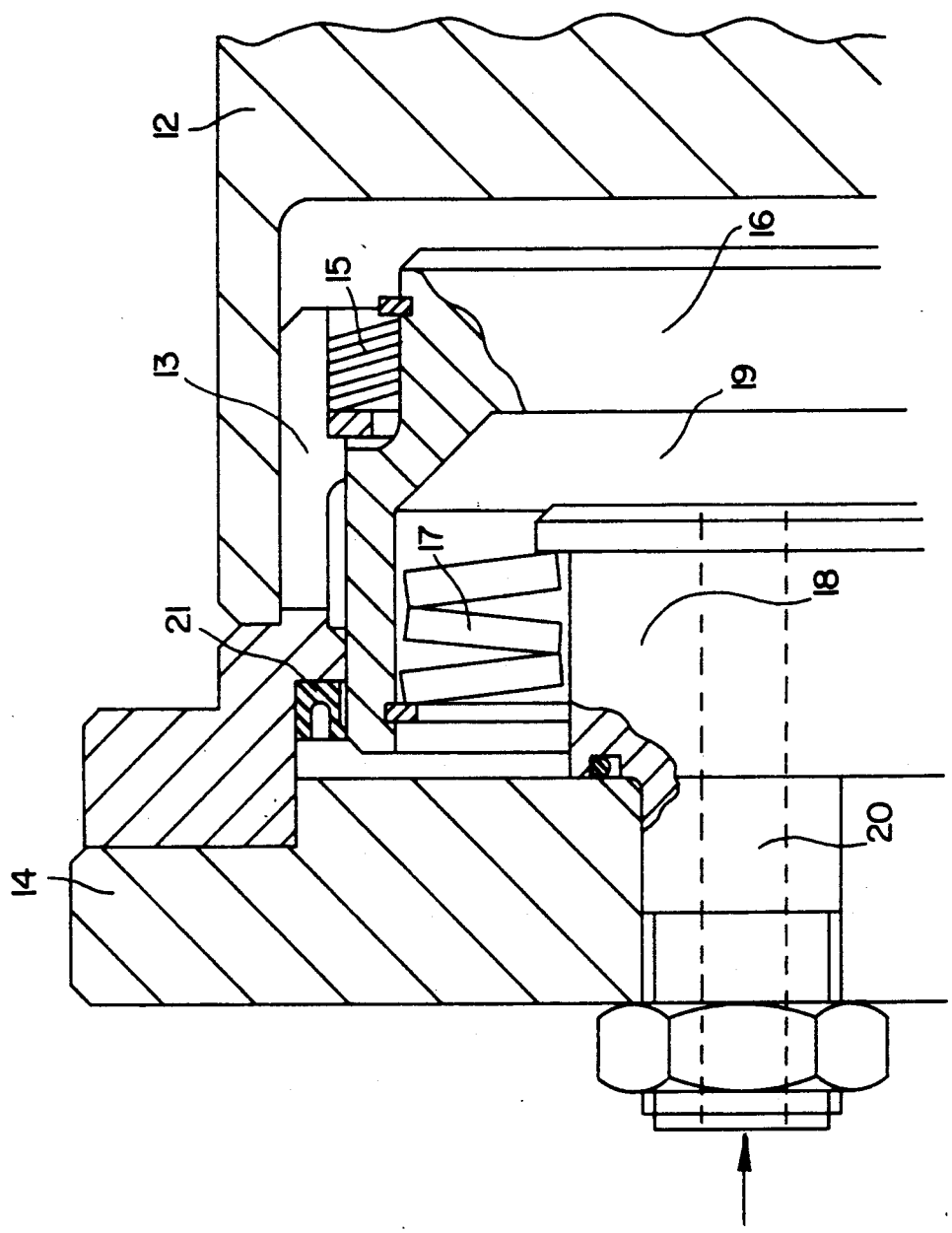
FIG. 3 is an axial section through a hub coupling.

FIG. 3 shows a structure for the case where the part to be coupled is hublike. Instead of the shaft 1, FIG. 3 accordingly shows a hub 12.

The radially elastic bush 13, which is connected in a manner fixed against relative rotation to the connection part 14 of a drive mechanism, not shown, is disposed in the inner cylinder of the hub 12. From the inside, the bush 13 is acted upon by a set of conical tightening disks 15, which are braced axially against the bush 13 and an inner cylinder 16.

The inner cylinder 16 is axially displaceably guided on the bush 13 and in turn is urged in the axial direction by a pair of disk springs 17 placed counter to one another, such that the conical tightening disks 15 are forced into the clamping position.

Suitably, the disk springs 17 are disposed radially inside the inner cylinder 16, so that the axial length of the coupling is shortened.

On the inside, the disk springs are penetrated by a tang 18, which is connected to the end flange 14 and forms a fixed stop for bracing the disk springs.

The intermediate chamber 19 essentially formed by the inner cylinder 16 and the end flange 14 can be acted upon by pressure fluid by a line 20, so that the pressing of the disk springs 17 and thus the clamping action of the tightening disks 15 can be suspended. A seal 21 between the bush 13 and the inner cylinder 16 assures that no pressure fluid can escape from the chamber 19 to the tightening disks 15. Optionally, the passageway of the tang 18 through the end flange 14 can also be sealed off.

Figure 4:
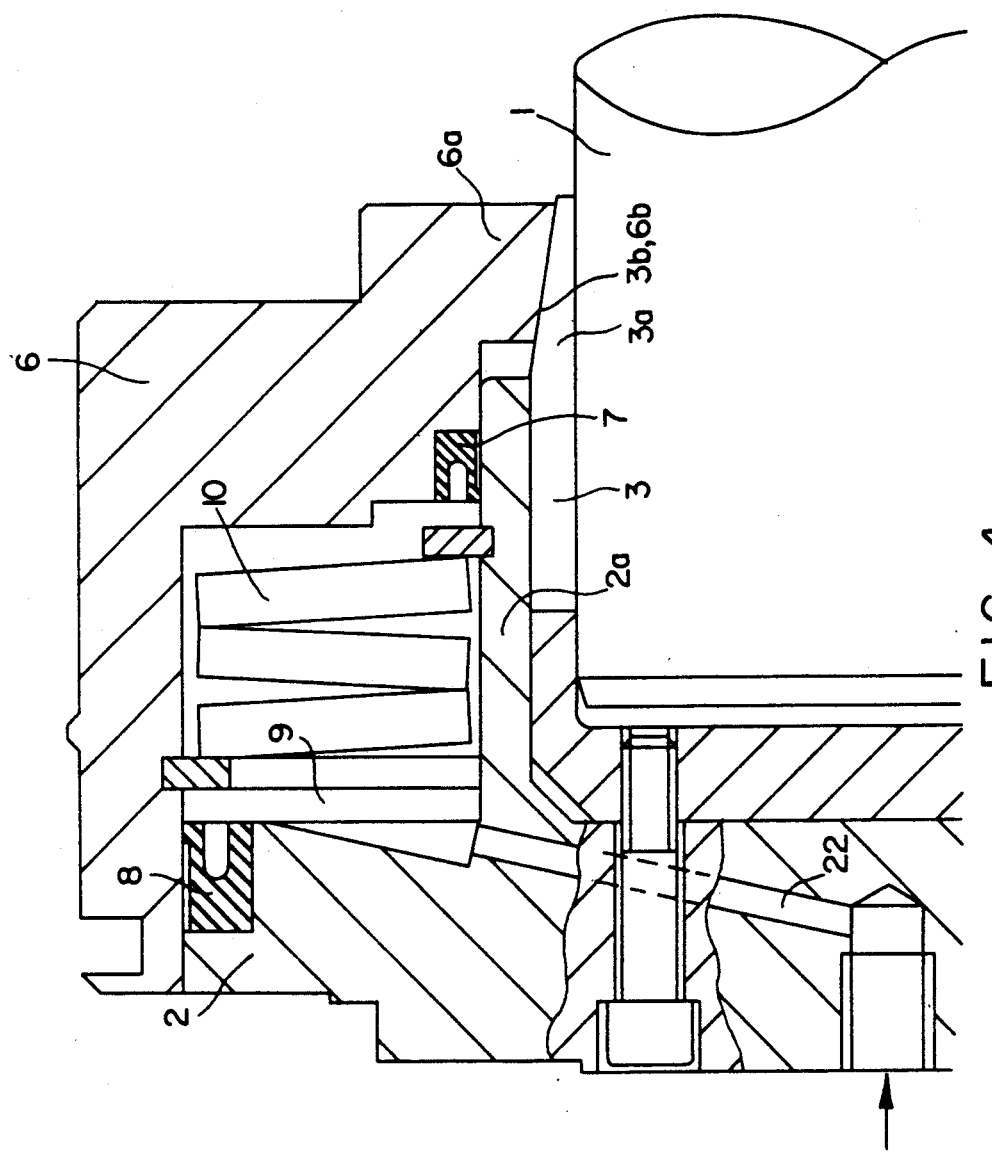
FIG. 4 is an axial section through a shaft coupling having conical faces that can be braced relative to one another.
Figure 5:
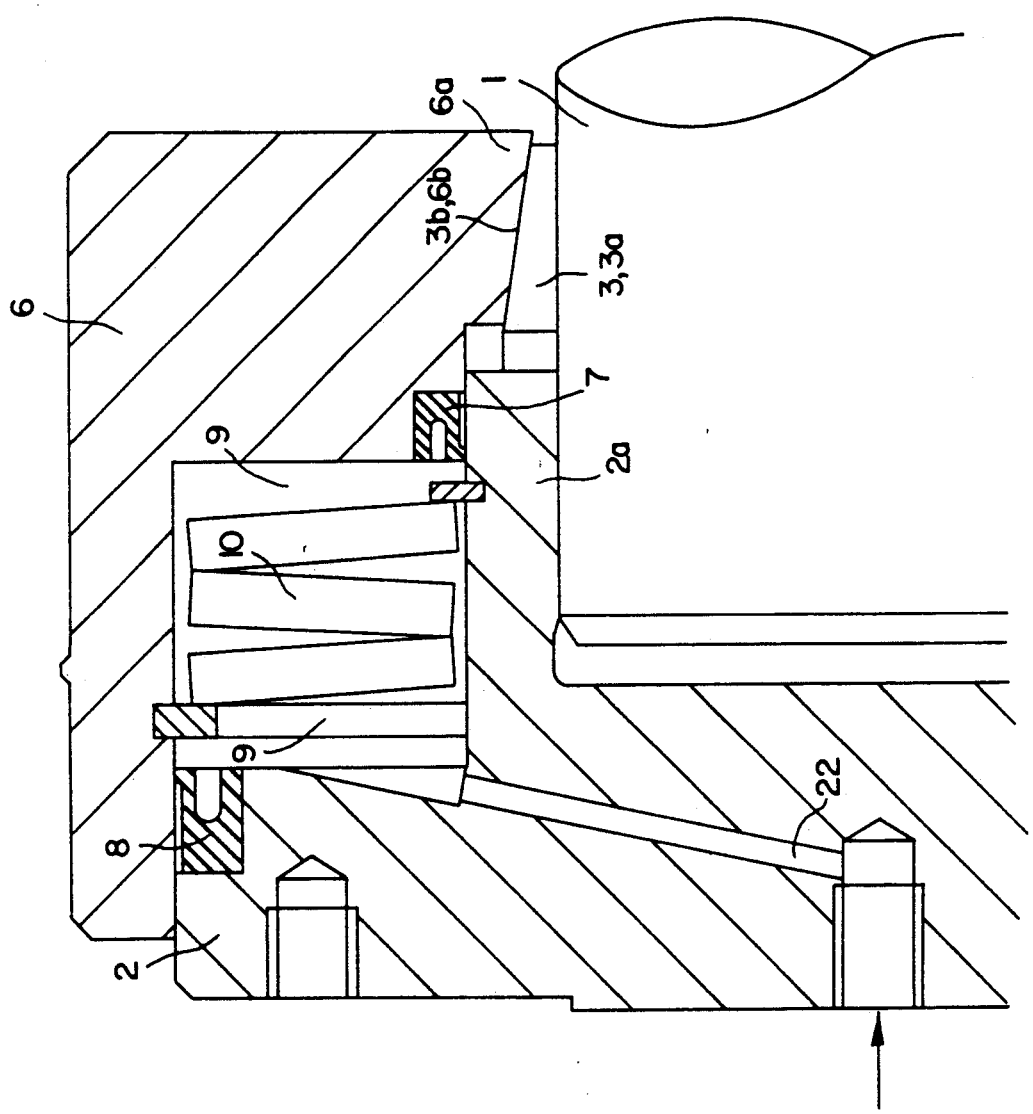
FIG. 5 is an axial section through a similar coupling.
Figure 6:
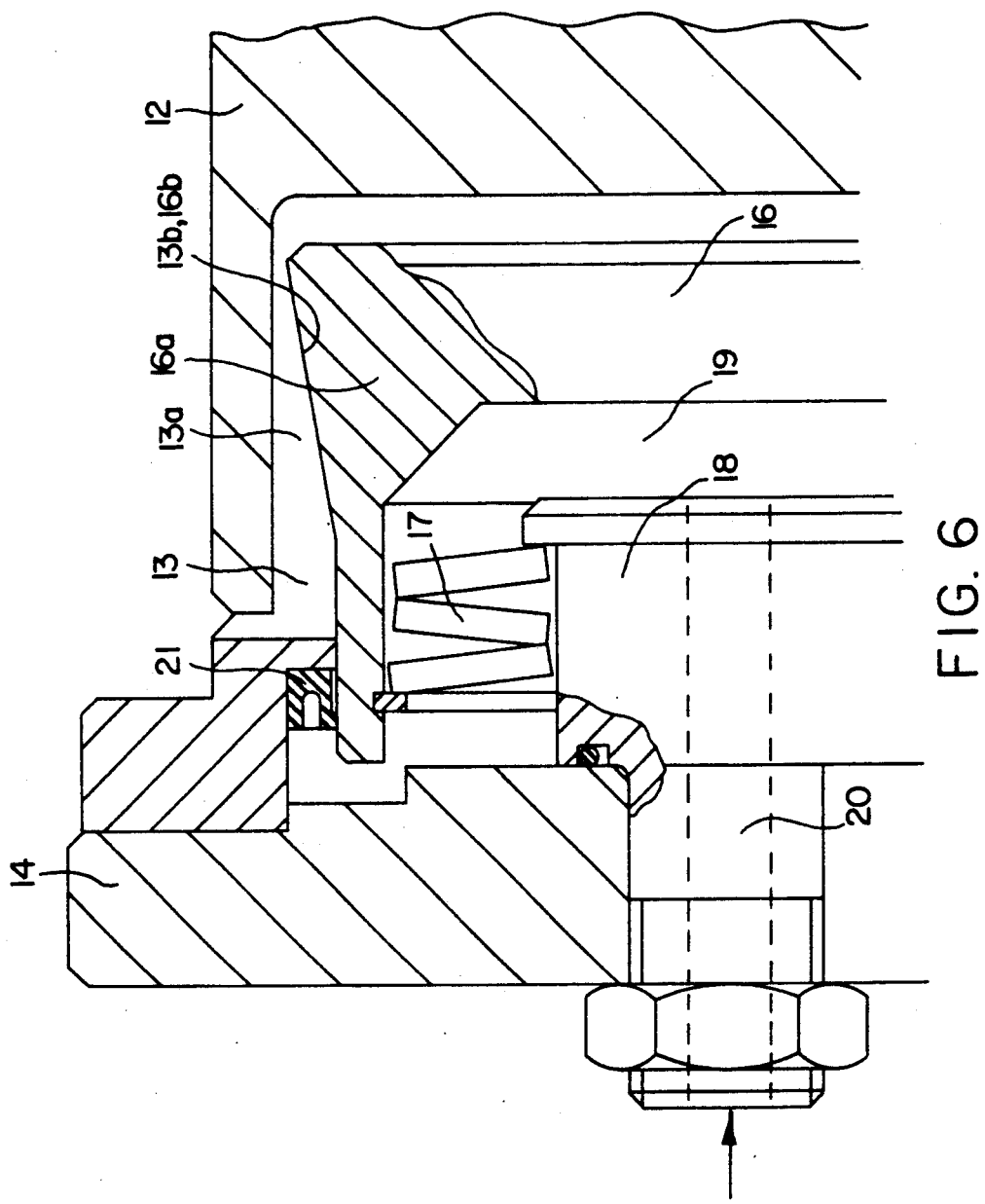
FIG. 6 is an axial section through a hub coupling.

FIGS. 4-6 basically illustrate the same inventive concept. However, here the axially exerted actuation force of the disk springs 10 is converted into the desired radially acting clamping force not through a plurality of conical tightening disks but rather by two conical elements, axially movable relative to one another, which thereby generate the desired radial force for bracing the bush 3 or 13. Since the main parts are the same as in FIGS. 1-3, the same reference numerals are used as applicable.

In FIGS. 4 and 5, the bush 3 has an outer conical circumferential face 3b for generating the conical bracing, at least over a portion 3a of its length. The other correspondingly conically shaped part 6a, which may be formed directly onto the outer cylinder 6, is seated directly on the conical face 3b.

As a result of the above-described axial positioning force of the disk springs 10, the outer cylinder 6 is displaced to the left relative to the end flange 2, and correspondingly the conical parts 3a and 6a are braced relative to one another. As a result, a radial force is generated that forces the bush 3 toward the shaft 1. The amount of taper is dimensioned such that the desired torque is reliably transmitted by the end flange 2 to the shaft 1, or vice versa.

The release of the coupling is effected as in FIGS. 1-3. By the displacement of the outer cylinder 6 to the right, the bracing to the conical parts is suspended, and thus the clamping action of the bush 3 is likewise suspended.

The same function is logically obtained in FIG. 6, where the part to be coupled, as in FIG. 3, is hublike in embodiment. Here, unlike FIG. 3, the bush 13 is embodied conically on its inside 13b, and can be braced against the conical outside 16b of the inner cylinder 16. In other words, the conical elements here are embodied by the parts 13a and 16a, which may be direct components of the bush 13 and cylinder 16, respectively.

Advantageously, the conical circumferential face 3b, 6b or the conical inside or outside surface of the bush (13b, 16b respectively) are coated with polytetrafluoroethylene (TEFLON) to reduce friction between adjoining surfaces.

All of the exemplary embodiments described have the same advantage that the cylinder chamber 9 or 19 acted upon by pressure fluid contains the springs 10 or 17, so that no additional structural space is needed for them, and that the cylinder and piston arrangement is largely embodied by parts of the coupling housing, that is, in FIGS. 1, 2, 4 and 5 by the parts 6 and 2, and in FIG. 3 and 6 by the parts 16 and 14, respectively.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for coupling a rotationally cylindrical part, in particular a shaft means (1, 12), to an operative mechanism, comprising a coupling housing, a radially resilient bush (3, 13), a clamping means (4, 15; 3a, 6a; 13a, 16a), said clamping means adapted to clamp said resilient bush to the cylindrical part radially when loaded by an axially operative force, a spring assembly (10, 17) positioned relative to said clamping means and disposed so as to exert said axially operative force upon said clamping means to effect a coupling of the cylindrical part (1, 12) to the bush (3, 13), a cylinder and piston means (2, 6; 14, 16) positioned relative to said clamping means and actuated by a pressure means to release said clamping means, said pressure means adapted to urge the spring assembly counter to its axially operative force acting upon the clamping means, said spring assembly (10, 17) being disposed in a cylinder chamber (9, 19) formed by said cylinder and piston means.

2. An apparatus as defined by claim 1, in which said shaft means comprises a hublike part.

3. An apparatus as defined by claim 1, in which the cylinder (6, 16) is an axially displaceable part of said cylinder and piston means and forms a part of the coupling housing of the apparatus.

4. An apparatus as defined by claim 1, in which the piston (2, 14, 18) is an axially stationary part of said cylinder and piston means and forms a housing and flange of the apparatus which is connected to said operative mechanism.

5. An apparatus as defined by claim 1, in which a shaft is coupled to the bush (3) which is connected to a housing end flange, and the cylinder chamber (9) is defined between said housing end flange and an outer cylinder (6) of approximately L-shaped profile displaceable relative to said housing end flange.

6. An apparatus as defined by claim 3, in which a shaft (1) is coupled to the bush (3) which is connected to a housing end flange, and the cylinder chamber (9) is defined between said housing end flange and said cylinder of approximately L-shaped profile displaceable relative to said housing end flange.

7. An apparatus as defined by claim 4, in which a shaft (1) is coupled to the bush (3) which is connected to said housing end flange, and the cylinder chamber (9) is defined between said housing end flange and an outer cylinder housing of approximately L-shaped profile displaceable relative to said housing end flange.

8. An apparatus as defined by claim 5, in which the spring assembly (10) is supported on the bush (3) via an intermediate part (11).

9. An apparatus as defined by claim 8, in which the intermediate part (11) is sealed off from the bush (3) and from the outer cylinder (6) via seals (7).

10. An apparatus as defined by claim 2 for coupling a hublike part (12), in which the cylinder and piston assembly means extends into the hublike part (12) and the spring assembly (17), is disposed on a tang (18), of a housing end flange (14), said tang functioning as a piston.

11. An apparatus as defined by claim 1, in which the cylinder chamber (9, 19) containing the spring assembly (10, 17) is sealed off from the clamping means (4, 15; 3, 3a, 13a, 16a) by means of seals (7, 21).

12. An apparatus as defined by claim 1, in which the clamping means comprises a plurality of conical tightening disks (4, 15) disposed axially beside one another.

13. An apparatus as defined by claim 12, in which the conical tightening disks (4) are disposed in a bore (6a) of the cylinder (6) that is accessible from the outside.

14. An apparatus as defined by claim 13, in which the tightening disks (4) are supported in said bore (6a) of the cylinder (6) disposed with an axially outer edge against a radially elastic securing ring (27), which securing ring can be locked into place in a groove (28) provided in said bore.

15. An apparatus as defined by claim 1, in which the clamping means comprises elements (3a, 6a; 13a, 16a) that are movable axially relative to one another and in so doing slide on one another along their conical circumferential faces (3b, 6b; 13b, 16b).

16. An apparatus as defined by claim 15, in which the conical circumferential faces (3b, 6b; 13b, 16b) are formed directly on the bush (3, 13) and on the cylinder (6, 16), respectively.

17. An apparatus as defined by claim 15, in which at least one of the conical circumferential faces (3b, 6b; 13b, 16b) is coated with a friction-reducing material, in particular a polytetrafluoroethylene tetrafluoroethylene (TEFLON) compound.

18. An apparatus as defined by claim 16, in which at least one of the conical circumferential faces (3b, 6b; 13b, 16b) is coated with a friction-reducing material, in particular a polytetrafluoroethylene (TEFLON) compound.

19. An apparatus as defined by claim 1, in which said pressure means comprises hydraulic pressure.

20. An apparatus as defined by claim 1, in which said pressure means comprises pneumatic pressure.

* * * * *